United States Patent Office 3,187,063
Patented June 1, 1965

3,187,063
ALKYLATION OF AROMATICS
Emmett H. Burk, Jr., Hazel Crest, Ill., and Stephen M. Kovach, Highland, Ind., assignors to Sinclair Research, Inc., Wilmington, Del., a corporation of Delaware
No Drawing. Filed Apr. 11, 1962, Ser. No. 186,633
6 Claims. (Cl. 260—671)

This invention relates to the alkylation of aromatics with an alkylating agent and is particularly concerned with the methylation of aromatics with a methylating agent in the presence of an alkylation catalyst. Specifically, the present invention relates to a method for increasing the utilization of the methylating agent such as methanol or dimethyl ether, in the methylation of aromatics be employing a hydrogen-carbon monoxide gas mixture as a diluent in the presence of an alkylation catalyst.

Although catalytic processes for the methylation of aromatics with methanol have been suggested, methanol utilization in these processes has been low. Methanol under alkylation conditions is in equilibrium with dimethyl ether, i.e. in the alkylation of aromatics with methanol or dimethyl ether there is an equilibrium mixture of methanol and dimethyl ether present with usually about 65 to 75% of the equilibrium mixture being dimethyl ether. The methylation of aromatics with methanol in the presence of an alkylation catalyst and hydrogen can undergo a variety of reactions, viz. methylation, etherification, and decomposition of methanol to hydrogen and carbon monoxide. The present process provides one or more of the following advantages: good utilization of the methylating agent, low carbon yields resulting in less carbon laydown on the catalyst and less water production. By employing a hydrogen-carbon monoxide gas mixture as a diluent, the decomposition of the methylating agent is suppressed resulting in increased methylation, decreased carbon laydown on the catalyst and decreased water production. The use of a hydrogen-carbon monoxide gas mixture as a diluent has a directing effect upon the reaction, viz. suppressing the decomposition of methanol and resulting in the formation of increased amounts of methylated aromatics as the essential reaction product.

When aromatics and alcohols are processed over acidic catalysts under alkylation processing conditions one of the major products is water. The presence of large amounts of water in the product dictates the use of equipment for separation of the water-hydrocarbon layers and further drying of the hydrocarbon layer before processing. Catalyst life is lowered due to sublimation and leaching of catalytic materials from the catalyst and loss of activity due to sintering and collapse of catalyst structure. This invention employs hydrogen-carbon monoxide gas mixtures during the methylation of aromatics over acidic catalysts containing metal, e.g. metal oxides, possessing hydrogenation-dehydrogenation activity. By employing a hydrogen-carbon monoxide mixture during methylation with methanol or dimethyl ether, the amount of water obtained as a by-product can be reduced to very low values for a given amount of alkylation. Methanol can be produced from the hydrogen-carbon monoxide gas mixtures over a metal oxide catalyst under select processing conditions. Therefore, the methanol can be produced in situ from the hydrogen-carbon monoxide gas mixture in the alkylation reaction.

In accordance with this invention the alkylatable hydrocarbon and the methylating agent are contacted with the alkylation catalyst at temperatures from about 400 to 1000° F., preferably in the range of about 500 to 800° F., while the pressure may range from about ambient pressures or less up to about 2000 p.s.i.g., e.g. about 0 to 2000 p.s.i.g., and are preferably elevated pressures ranging from about 50 to 1000 ps.i.g. The catalyst can be used as a fixed, moving or fluidized bed or in any other convenient type of handling system. The aromatic space velocity will in most cases be from about 0.001 to 20, and preferably about 0.01 to 10 weights of aromatic per weight of catalyst per hour (WHSV). The methylating agent is generally employed in a molar ratio to aromatic of about 0 to 2:1 and preferably of about 0.1 to 1:1. The initial mol ratio of hydrogen to carbon monoxide to the alkylatable aromatic for best results should be within the range of about 1:1:1 to about 20:20:1, preferably in the range of about 1:1:1 to about 20:10:1.

The methylating agent of the present invention has the general formula $$CH_3OR$$

wherein R is selected from the group consisting of hydrogen or methyl. As mentioned above, methanol under the present processing conditions is in equilibrium with dimethyl ether and therefore methylation may actually be carried out by adding either agent.

The alkylation can be accomplished in the present invention by employing a catalyst which contains a metal, e.g. a metal per se or the oxide or other combined form which possesses hydrogenation-dehydrogenation activity. The metal promoter is on a catalytic support. The metal component or components may be from groups IB, IIB, VIB and VIII of the periodic arrangement of elements, e.g. copper, zinc, chromium, molybdenum, tungsten, platinum, rhodium, cobalt, nickel and ruthenium and combinations of the same. The catalytic amount of active component deposited on the catalytic support may be in the range of about 0.01 to 25 or more weight percent, preferably in the range of about 0.1 to 20 weight percent based on the weight of the entire catalyst.

The carriers or supports for the catalysts utilizable in the process of this invention are usually synthetic composites of two or more refractory oxides, which composites are acidic in nature. Generally, this group includes oxides of the metals of groups IIA, IIIA, IIIB, IVA and IVB of the periodic arrangement of elements. Examples of the composites contemplated include cracking supports such as for instance, silica-alumina, silica-zirconia, silica-magnesia and the like. Activated aluminas containing only small amounts of other metal or non-metal oxides may be employed to impact acidic properties. The base can include minor amounts, for instance, from about 1 to 20 weight percent, of other ingredients such as promoters, particularly acidic promoters. Thus, the catalystic base can contain halogen, e.g. chlorine or fluorine usually in amounts of from about 0.1 to 3 percent by weight. A preferred support is a synthetic composite of silica and alumina which contains between about 1 percent by weight and about 40 percent by weight of alumina, preferably about 10 to 25 weight percent alumina. The silica content of the catalyst support is predominant, i.e. silica is preferably present in amounts from about 60 to 90 weight percent.

In preparing the alkylation catalysts of this invention the acidic type support can be impregnated with an aqueous solution of a water-soluble salt of the metal component. Such metal salts as acetates, chlorates, chlorides, nitrates, iodides and sulfates may be used. The two-metal alkylation catalysts may be prepared by simultaneous impregnation with the metal salts thereof or impregnation may take place in sequential steps. Before impregnation with the metal component, the acidic type support may be given a pretreatment with mineral acids such as hydrochloric acid or hydrofluoric acid. In accordance with this invention sufficient amounts of the metal component, such as the promoting metal oxides can be incorporated in the catalyst to give, after calcination and reduction, a composition containing the desired amount of metal.

When employing the impregnation procedure, after impregnation, the resulting impregnated product can be dried generally at a temperature within the range of about 170° to 400° F. for at least about 6 hours and up to 24 hours or more with a slow stream of air circulated to carry off the water vapor. The dried catalyst mixture then may be formed by a tabletting or extruding operation. If the catalyst is to be in a finely divided form, a grinding operation may follow drying. In case of tabletting it is customary to incorporate a die lubricant which advantageously is organic and can be burned out by oxidation in the calcination step. The dried pellets are suitable for subjection to high temperature treatment or calcination at a temperature between about 500° F. and about 1500° F., preferably about 700° F. and 1000° F., for instance for a period of between about 2 and about 36 hours. It is generally preferred that the calcining operation be conducted in a manner minimizing contact time of the silica-alumina containing product with water vapor at the high temperature encountered.

The catalyst employed in the process of the present invention can be easily regenerated employing conventional procedures, for instance by subjecting it to an oxygen containing gas at temperatures sufficient to burn off carbon deposited on the catalyst during alkylation. This oxygen-containing gas, e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

The aromatics, e.g. alkylatable aromatic hydrocarbons, suitable for alkylation in the present process include mono- and polycyclic aromatic hydrocarbon compounds such as benzene and its lower alkyl homologues, e.g. toluene and the xylenes, naphthalene, and indane, which may be substituted or unsubstituted. The substituted aromatic compounds must, however, contain at least one hydrogen attached to the aromatic nucleus and are preferably methyl-substituted. These compounds may correspond to the general formula

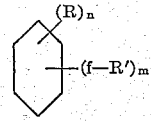

where R is an alkyl, including cyclo alkyl, radical containing generally from about 1 to 20, preferably from about 1 to 8, carbon atoms; $n$ is 0 to 3 or 5; R' is an aromatic hydrocarbon ring, preferably $C_4H_4$; —f— indicates a fused ring relationship (two carbon atoms common to two aromatic nuclei, e.g. as in naphthalene); and $m$ is generally 0 to 1 or more. R may also be a divalent hydrocarbon group attached to the aromatic ring at two carbon atoms of the ring, e.g. alkylene, as in decalin and tetralin.

The preferred aromatics, however, include alkyl benzenes corresponding to the above formula where $m$ is 0. The preferred feedstock comprises a methyl benzene of 7 to 9 carbon atoms. The aromatic rings and R groups may be substituted as with phenyl, hydroxy, alkoxy, halide and other radicals which do not prevent the desired reaction. Suitable aromatic hydrocarbons include benzene, toluene, ortho-xylene, meta-xylene, para-xylene, ethyl-benzene, ortho-ethyltoluene, meta-ethyltoluene, para-ethyltoluene, 1,2,3-trimethylbenzene, 1,2,4-trimethylbenzene, 1,3,5-trimethylbenzene or mesitylene, normal propylbenzene, isopropylbenzene etc. Higher molecular weight alkyl-aromatic hydrocarbons can also be used as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons containing condensed benzene rings include naphthalene, alpha-methylnaphthalene, beta-methylnaphthalene, anthracene, phenanthrene, naphthacene, rubrene, etc. Indane is another. The above alkylatable aromatics can be used alone or in mixtures.

The following examples will serve to illustrate the instant invention but they are not to be considered as limiting.

The alkylation runs are conducted in a 1-inch internal diameter universal stainless steel reactor heated by a bronze-block furnace. The temperature of the reactor is controlled by Fenwall thermostats and the temperature of the catalyst bed is measured by means of iron-constantan thermocouples located throughout the bed.

EXAMPLE I–II 1 mole of ortho-xylene and 1 mole of methanol are charged to the reactor containing a platinum-silica-alumina catalyst from a stainless steel bomb by nitrogen displacement. Both the liquid feed and diluent gas, i.e. hydrogen are metered to the reactor through Fischer-Porter rotameters. The liquid products are separated from the effluent gases in a Jergenson liquid-level gauge and then released to atmospheric pressure at room temperature. The volume of dry gas is measured by means of a wet test meter and spot and continuous gas samples are taken. The gas samples are analyzed by mass spectrometer techniques. Total hydrocarbon analyses are by vapor phase chromatography. Example I is conducted under the conditions specified in Table I presented below.

Example II is conducted under substantially the same conditions as Example I except that the diluent gas comprises a mixture of hydrogen and carbon monoxide. The results from Table I show that employing a mixture of hydrogen and carbon monoxide as a diluent during methylation with methanol, methanol utilization is increased with little increase in carbon laydown on the catalyst.

EXAMPLES III–IV

These examples show the improved results in the methylation of ortho-xylene using a chromia-boria-alumina catalyst under the conditions specified in Table I. A comparison of these results show that when the diluent gas comprises a mixture of hydrogen and carbon monoxide, methanol utilization is increased and there is no increase in carbon laydown on the catalyst.

EXAMPLES V–VI

Examples V and VI were run under the conditions specified in Table I using a chromia-silica-alumina catalyst composition. A comparison of the results obtained show that not only was there an increase in methanol utilization but carbon laydown on the catalyst was decreased when a diluent gas comprising a mixture of hydrogen and carbon monoxide was used.

alkylatable aromatic. The results obtained are presented in Table III.

We claim:

1. A process for the alkylation of aromatics with a methylating agent having the formula $CH_3OR$ where R is selected from the group consisting of hydrogen and methyl, which comprises contacting an alkylatable aromatic with said methylating agent under alkylation con-

Table I

| Catalyst | 0.5% Pt/SiO$_2$-Al$_2$O$_3$ (88% silica) (12% alumina) | | 10% Cr$_2$O$_3$, 10% B$_2$O$_3$ on Al$_2$O$_3$ | | 18% Cr$_2$O$_3$ on SiO$_2$-Al$_2$O$_3$ (88% silica) (12% alumina) | |
|---|---|---|---|---|---|---|
| Example | I | II | III | IV | V | VI |
| Feed | O-xylene | | | | | |
| Conditions: | | | | | | |
| Temperature, °F | 750 | 750 | 700 | 700 | 700 | 700 |
| Pressure, p.s.i.g | 100 | 100 | 400 | 400 | 400 | 400 |
| WHSV | .24 | .30 | .24 | .24 | .39 | .37 |
| H$_2$/CO/Arom | 7/0/1 | 8/4/1 | 7/0/1 | 8/4/1 | 7/0/1 | 8/4/1 |
| Arom./CH$_3$OH | 1/1 | 1/1 | 1/1 | 1/1 | 1/1 | 1/1 |
| Methanol utilization (based on C) | 19 | 46 | 45 | 59 | 49 | 57 |
| Carbon on catalyst, wt. percent | 0.0 | 0.10 | 0.29 | 0.29 | 1.08 | 0.92 |

EXAMPLES VII TO XII

These examples show that when using hydrogen-carbon monoxide gas mixtures during methylation with methanol the amount of water obtained as a by-product was reduced. Table II presents comparative data showing the results obtained on water removal when using a hydrogen-carbon monoxide gas mixture as a diluent.

ditions including a temperature of about 400 to 1000° F. and in the presence of an alkylation catalyst having hydrogenation-dehydrogenation activity, the improvement comprising conducting said alkylation in the presence of a diluent gas mixture comprising hydrogen and carbon monoxide in a molar ratio of hydrogen to carbon monoxide to said alkylatable aromatic of about 1:1:1 to about 20:20:1.

Table II

| Catalyst | 10% Cr$_2$O$_3$, 10% B$_2$O$_3$ on Al$_2$O$_3$ | 5% CuO, 5% Cr$_2$O$_3$, 10% B$_2$O$_3$ on Al$_2$O$_3$ | 10% Cr$_2$O$_3$, 10% B$_2$O$_3$ on Al$_2$O$_3$ | | 0.49% Pt on SiO$_2$-Al$_2$O$_3$ (88% silica) (12% alumina) | |
|---|---|---|---|---|---|---|
| Example | VII | VIII | IX | X | XI | XII |
| Feed | O-xylene | | | | | |
| Conditions: | | | | | | |
| Temperature, °F | 650 | 650 | 700 | 700 | 800 | 800 |
| Pressure, p.s.i.g | 200 | 400 | 400 | 400 | 300 | 300 |
| WHSV | 0.23 | 0.25 | 0.24 | 0.24 | 0.37 | 0.31 |
| Arom./MeOH | 1/1 | 1/1 | 1/1 | 1/1 | 1/1 | 1/1 |
| H$_2$/CO/Ar | 7/0/1 | 8/4/1 | 7/0/1 | 8/4/1 | 7/0/1 | 8/4/1 |
| Methanol utilization | 67 | 48 | 45 | 59 | 25 | 47 |
| Water, wt. percent feed | 12.1 | 2.2 | 7.0 | 5.0 | 10.1 | 3.3 |
| Carbon on cat., wt. percent | 0.10 | 0.10 | 0.10 | 0.40 | 0.15 | 0.24 |

Examples IX and X are the same as Examples III and IV. It will be noted that in Example X the amount of water based on the weight of the feed is decreased by approximately 28%. Also in Examples XI and XII the amount of water was reduced by about 65 weight percent. Example VIII shows that by incorporating the oxide of copper on the catalyst composition of Examples IX and X water reduction is greatly increased.

EXAMPLES XIII TO XIV

These examples show that when using a hydrogen-carbon monoxide gas mixture as a diluent, methanol is produced in situ which may be utilized to methylate an

Table III

| Catalyst | 10% ZnO, 5% CuO, 5% Cr$_2$O$_3$ on SiO$_2$-Al$_2$O$_3$ | |
|---|---|---|
| Example | XIII | XIV |
| Feed | Psuedo cumene | |
| Conditions: | | |
| Temp., °F | 600 | 600 |
| Pressure, p.s.i.g | 500 | 700 |
| WHSV | 0.43 | 0.43 |
| H$_2$/CO/Arom | 4/4/1 | 4/4/1 |
| Arom./CH$_3$OH | 1/0 | 1/0 |
| Methanol utilization (based on CH$_3$OH/Arom.) | 4 | 5 |
| Carbon on catalyst (wt. percent) | 0.0 | 0.0 |

2. The process of claim 1 wherein the methylating agent is added as methanol.

3. The process of claim 1 wherein the alkylatable aromatic hydrocarbon is a methyl benzene of 7 to 9 carbon atoms.

4. The process of claim 3 wherein the methylated benzene is contacted with methanol under alkylation conditions including a temperature of 500 to 800° F. and in the presence of a diluent gas mixture comprising hydrogen and carbon monoxide in a molar ratio of hydrogen to carbon monoxide to said methylated benzene of about 1:1:1 to about 20:10:1.

5. The process of claim 4 wherein the alkylation catalyst consists essentially of chromia on silica-alumina.

6. The process of claim 1 wherein the alkylatable aromatic is xylene and the catalyst consists of a catalytic-promoting metal on an acidic support.

References Cited by the Examiner

UNITED STATES PATENTS 2,447,599  8/48  Schmerling _____ 260—671
2,756,261  7/56  Fetterly _____ 260—671

ALPHONSO D. SULLIVAN, *Primary Examiner.*